United States Patent
Yan et al.

(10) Patent No.: US 10,786,828 B2
(45) Date of Patent: Sep. 29, 2020

(54) ANTI-CORROSION COATING SINTERED AT LOW TEMPERATURE FOR STEEL REBARS AND COATING METHOD

(71) Applicant: Zhejiang University, Hangzhou (CN)

(72) Inventors: Dongming Yan, Hangzhou (CN); Yi Liu, Hangzhou (CN); Luodong Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 149 days.

(21) Appl. No.: 15/748,860

(22) PCT Filed: Mar. 1, 2017

(86) PCT No.: PCT/CN2017/075307
§ 371 (c)(1),
(2) Date: Jan. 30, 2018

(87) PCT Pub. No.: WO2017/148384
PCT Pub. Date: Sep. 8, 2017

(65) Prior Publication Data
US 2018/0214910 A1    Aug. 2, 2018

(30) Foreign Application Priority Data
Mar. 4, 2016  (CN) .......................... 2016 1 0125270

(51) Int. Cl.
| | | |
|---|---|---|
| *C23C 24/00* | (2006.01) | |
| *B05D 3/02* | (2006.01) | |
| *B05D 7/20* | (2006.01) | |
| *C09D 1/00* | (2006.01) | |
| *C09D 5/08* | (2006.01) | |
| *C09D 7/40* | (2018.01) | |
| *C09D 7/43* | (2018.01) | |
| *C09D 7/61* | (2018.01) | |
| *B05D 7/24* | (2006.01) | |
| *E04C 5/01* | (2006.01) | |
| *C08K 3/22* | (2006.01) | |

(52) U.S. Cl.
CPC ............. *B05D 3/0236* (2013.01); *B05D 3/02* (2013.01); *B05D 7/20* (2013.01); *B05D 7/24* (2013.01); *C09D 1/00* (2013.01); *C09D 5/08* (2013.01); *C09D 7/40* (2018.01); *C09D 7/43* (2018.01); *C09D 7/61* (2018.01); *E04C 5/015* (2013.01); *C08K 2003/2262* (2013.01); *C08K 2003/2275* (2013.01)

(58) Field of Classification Search
CPC ......... C23C 20/00; C23C 20/06; C23C 20/08; C23C 24/00; C23D 5/00
See application file for complete search history.

(56) References Cited

FOREIGN PATENT DOCUMENTS

| CN | 1519213 A | * | 8/2004 | ............... C03C 8/06 |
|---|---|---|---|---|
| CN | 1519213 A | | 8/2014 | |
| CN | 105131659 A | * | 12/2015 | |

OTHER PUBLICATIONS

Borisova et al "Mesoporous Silica Nanoparticles for Active Corrosion Protection" ACS Nano vol. 5, No. 3, 2011, pp. 1939-1946 (Year: 2011).*

* cited by examiner

*Primary Examiner* — Nathan H Empie

(57) ABSTRACT

This invention discloses an anti-corrosion coating sintered at low temperature for steel rebars. The composition of coating includes 30-50 weight percent nano-silica, 20-40 weight percent flux, 9-20 weight percent calcium fluoride, 2-10 weight percent thickener, and 2-14 weight percent adhesion, agent. This invention also discloses the coating method of above-mentioned anti-corrosion coating. The method includes seven steps: 1. dry mixing, 2. wet mixing, 3. pretreatment, 4. coating, 5. baking, 6. sintering, 7. cooling down at room temperature. The coating of this invention has high strength, high density, high corrosion resistance, good capacity to bond with concrete, and maintains the mechanical properties of steel rebars.

1 Claim, 2 Drawing Sheets

Table 1. The accelerated corrosion test of steel rebars.

| Corrosion time(h) / Number | Round steel rebar | | Ribbed steel rebar | |
|---|---|---|---|---|
| | Uncoated | Coated | Uncoated | Coated |
| 1 | 210 | 673 | 215 | 778 |
| 2 | 190 | 778 | 159 | 689 |
| 3 | 122 | 798 | 142 | 763 |
| 4 | 232 | 774 | 189 | 675 |
| 5 | 170 | 625 | 210 | 733 |
| Average | 185 | 729 | 183 | 727 |

FIG. 1

Table 2. Mechanical properties of the coated steel rebars after heat-treating at high temperature.

|  | Yield strength | Ultimate strength | Cold bending performance | Surface feature |
|---|---|---|---|---|
| 200°C | Compared with room temperature, the yield strength is increased 4MPa. | Compared with room temperature, the ultimate strength is increased by 8 MPa. | No rust peels off. Cold bending performance is good. | The surface is dark red. |
| 400°C | Compared with 200°C, the yield strength is nearly same. | Compared with 200°C, the ultimate strength is nearly same. | Local rust peels off. | The surface is slightly red. |
| 600°C | Compared with room temperature, the yield strength is decreased 8.6%. | Compared with room temperature, the ultimate strength is nearly same. | Local rust peels off. | The surface is reddish brown. |
| 800°C | Compared with room temperature, the yield strength is decreased 18.6%. | Compared with room temperature, the ultimate strength is decreased 9%. | Rust peels off seriously. | The surface is reddish brown. |

FIG. 2

ANTI-CORROSION COATING SINTERED AT LOW TEMPERATURE FOR STEEL REBARS AND COATING METHOD

CROSS-REFERENCE TO RELATED APPLICATION

This application is a national stage application of International application number PCT/CN2017/075307, filed Mar. 1, 2017, titled "ANTI-CORROSION COATING SINTERED AT LOW TEMPERATURE FOR STEEL REBARS AND COATING METHOD," which claims the priority benefit of Chinese Patent Application No. CN201610125270.4, filed on Mar. 4, 2016, which is hereby incorporated by reference in its entirety.

TECHNICAL FIELD

The present invention relates to metallic materials used for concrete structures, more particularly, to an anti-corrosion coating sintered at low temperature for steel rebars and coating method.

BACKGROUND

Entering the 21$^{st}$ century, China has entered the era of rapid economic development in the coastal area. It can be expected that there will be a large number of harbor terminals, cross-sea bridges, tunnels, offshore platforms constructed with reinforced concrete in the future. Rebar corrosion becomes an important factor which influences reinforced concrete durability. As a result, it is an urgent task for engineers in civil engineering to solve the rebar corrosion problem. Employing new materials and new technologies are two very effective ways to solve the problem.

With the progress of rebar corrosion and protection mechanism research in reinforced concrete structures, the coating technology of steel rebars has been developed rapidly. At present, the coating technology can be divided into three types according to different coating materials: 1. metallic materials coated steel rebars: such as stainless steel thermal spray coated steel rebars, galvanized steel rebars, etc. 2. organic materials coated steel rebars: such as epoxy coated steel rebars. 3. inorganic materials coated steel rebars: such as phosphates coated steel rebars, enamels coated steel rebars, etc.

For engineering application, the cost of metallic materials coated steel rebars is 2-5 times higher than uncoated steel rebars. Therefore, metallic materials coated steel rebars cannot be widely used in large coastal engineering projects.

Epoxy coated steel rebars are usually produced by an electrostatic spraying method. The epoxy powder is sprayed on the surface of ribbed steel rebars or round steel rebars to form uniform coatings. As disclosed in "Epoxy coated steel rebars" (Chinese Patent CN201593271), the epoxy coated steel rebars can solve the problem of rebar corrosion effectively, and improve the life of the buildings remarkably. Although epoxy coating has a good corrosion resistance, the adhesion force between concrete and epoxy coated steel rebars is significantly reduced, and epoxy coating, when exposed to ambient air, are oxidized easily, which seriously impairs its anti-corrosion capability.

As disclosed in "Double epoxy coated steel rebars and coating method" (Chinese Patent CN103074960), the double epoxy coated steel rebar is comprised of the substrate steel rebar, the inner layer coating, and the outer layer coating. The outer layer coating has a good wear resistance and corrosion resistance, which can meet the needs of construction projects in a harsh environment. But there are still some problems: 1. the adhesion force between the outer epoxy coating and concrete is still very weak. 2. precision equipment is needed to ensure the adhesion between the outer and the inner coatings. 3. the double layer coating doubles the cost and is uneconomical.

As disclosed in "Phosphate-based anticorrosive coating" (Chinese Patent CN104404502), the anti-corrosion coating can be applied in marine reinforced concrete, and has a good adhesion force between coating and steel surface, also has a dense structure and high curing strength. As a matter of fact, these phosphate-based materials are adhesive and can be used for the repair of damaged concrete structures. However, the phosphate-based anticorrosive coating is easy to crack in a tension state.

Overall, the existing anti-corrosion coating technologies cannot meet the requirements of corrosion protection of steel rebars in the concrete structure under harsh corrosive environments. Therefore, it is urgent to explore a low cost, better durability, better corrosion resistant coating, and coating method.

BRIEF DESCRIPTION OF THE DRAWINGS

Implementations will now be described, by way of example only, with reference to the attached figures.

FIG. 1 is a table of the accelerated corrosion test of steel rebars.

FIG. 2 is a table of the mechanical properties of the coated steel rebars after heat-treating at high temperature.

DESCRIPTION OF THE INVENTION

To overcome the shortcomings of existing anti-corrosion coating technologies, this invention discloses a low cost, high corrosion resistance coating for steel rebars, which are sintered at low temperature and can maintain the mechanical properties of steel rebars, and coating method.

To solve the steel rebars corrosion problems, this invention provides an anti-corrosion coating sintered at low temperature, which is comprised of the following materials: 30-50 weight percent nano-silica, 20-40 weight percent flux, 9-20 weight percent calcium fluoride, 2-10 weight percent thickener, and 2-14 weight percent adhesion agent.

Preferably, the weight ratio of flux to nano-silica is (0.5-0.75):1.

Preferably, the thickener contains hydroxyethylcellulose or hydroxyethylcellulose, or a combination thereof.

Preferably, the adhesion agent contains manganese dioxide or ferrosoferric oxide, or a combination thereof Preferably, the flux contains at least one from the group of sodium metasilicate nonahydrate and borax.

Sodium metasilicate nonahydrate and borax are both fluxes, and the synergetic effect of both fluxes can significantly reduce the sintering temperature and improve sintering performance. With increasing temperature, the flux is melted and can bond to the powder around it. Meanwhile, complex chemical reactions occur among them. Compared to the amount of nano-silica, an insufficient amount of flux results in inefficient bonding among the nano-silica powder which leads to the formation of a loose coating; on the other hand, an excessive amount of flux leaves unbounded flux residues that hinder the formation of nano-silica-flux structure and reduce the mechanical strength of the coating structure.

As an important constituent of coating matrix, nano-silica particle at nanoscale ensures the high density of the coating.

The invention also discloses an anti-corrosion coating sintered at low temperature and a coating method, including the following steps.

1) Dry mixing: nano-silica, flux, calcium fluoride, thickener and adhesion agent are weighed out according to a weight percent composition, placed in a container and stirred, and placed into a mixing machine to mix thoroughly to yield a mixture A.

2) Wet mixing: at a weight ratio of the mixture A to water (2-5):1, water is added into the container, mixed with the mixture A, and the container is placed into the mixing machine to thoroughly mix to yield a slurry coating B 3) Pretreatment: rust on the surface of steel rebars is removed, the surface of the steel rebars is washed and dried.

4) Coating: the steel rebars obtained from step 3 are immersed in, rotated, and pulled out from the slurry coating B.

5) Baking: the coated steel rebars obtained from step 4 are baked at 90-130° C. for 20-40 minutes.

6) Sintering: the coated steel rebars obtained from step 5 are placed into a furnace and heated up at the rate of 3-10° C./min to 400-550° C. and maintained at 400-550° C. for 10 minutes.

7) Cooling down at room temperature.

The baking temperature should be strictly controlled. Baking at too high a temperature will make the water in the coating evaporate rapidly, which will lead to the expansion of inner coating and reduce the density of the coating. Baking at too low temperature will extend the drying time of coating, and increase energy consumption.

The invention has the following advantages and positive effects: (1) The anti-corrosion coating has an outstanding corrosion resistance. The corrosion resistance of the coating of steel rebars, sintered at low temperature, is increased by about 3-4 times compared with normal steel rebars. (2) The anti-corrosion coating has a longer durability. The coating, sintered at low temperature, belongs to inorganic material that has long durability. As a result, the coating can work well for a long time.

Overall, the remarkable advantages of the coating in the invention are high strength, high density, and good corrosion resistance. Due to the low sintering temperature, the steel rebar can maintain the mechanical properties of itself.

DETAILED DESCRIPTION OF THE PREFERRED EMBODIMENTS

Still, other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is to be noted that various changes and modifications practiced or adopted by those skilled in the art without creative work are to be understood as being included within the scope of the present invention as defined by the appended claims.

Embodiment 1

Pretreatment: a section of HRB335, HRB400 or HPB300 grade steel rebar is selected, buffed with abrasive paper and washed with 5% sulfuric acid to remove rust, then cleaned with water, and finally dried for later use.

Preparation of slurry coating: first, 45 weight percent nano-silica, 27 weight percent sodium metasilicate nonahydrate, 4 weight percent hydroxymethyl cellulose, 13 weight percent calcium fluoride, 4 weight percent manganese dioxide, and 7 weight percent ferrosoferric oxide are weighed and poured into a material tank, and stirred for 30 seconds. The weight ratio of sodium metasilicate nonahydrate to nano-silica is 0.6. The material tank is placed into a mixing machine to mix for 3-5 minutes to yield a well-dispersed mixture A. After dry mixing, 31 weight percent water is added to the mixture A, wherein the weight ratio of the mixture A to water is 2.3:1, then the mixture is stirred until it turns slurry. Then the material tank is placed into the mixing machine to mix for 5-7 minutes to yield a well-dispersed slurry coating B. The slurry coating B is poured out and let stand for 10 minutes in the container. After monitoring that there is no stratification and no water on the top of the slurry; the slurry coating B is poured into a storage container for further use.

Coating: the pretreated steel rebar is immersed in the slurry coating B with an iron clamp, and then slowly rotated and pulled out from the slurry coating B. The coating B is well and evenly coated on the surface of the steel rebar.

Baking: the coated steel rebar obtained from the slurry coating B is supported on two refractory blocks in an oven, and baked at 150° C. for 40 minutes.

Sintering: the baked steel rebar is taken out from the oven, placed in an electric furnace and heated up at a rate of 5° C./min to 550° C. and maintained at 550° C. for 10 minutes. Finally, the furnace is turned off and cooled to room temperature. The steel rebar with an anti-corrosion coating sintered at low temperature is obtained.

Embodiment 2

Pretreatment: same as embodiment 1.

Preparation of slurry coating: first, 38 weight percent nano-silica, 28 weight percent sodium metasilicate nonahydrate, 4 weight percent hydroxymethyl cellulose, 5 weight percent hydroxyethylcellulose, 14 weight percent calcium fluoride, 6 weight percent manganese dioxide, and 5 weight percent ferrosoferric oxide are weighed and poured into a material tank, and then stirred for 30 seconds. The weight ratio of sodium metasilicate nonahydrate to nano-silica is 0.74. The material tank is placed into a mixing machine for 3-5 minutes to yield the well-dispersed mixture A. After dry mixing 33 weight percent water is added to the mixture A, wherein the weight ratio of the mixture A to water is 2:1, then the mixture is stirred until it turns slurry. Then the material tank is placed into the mixing machine for 5-7 minutes to yield a well-dispersed slurry coating B. The slurry coating B is poured out and let stand for 10 minutes in the container. After monitoring that there is no stratification and no water on the top of the slurry, the slurry coating B is poured into a storage container for further use.

Coating: same as embodiment 1.

Baking: the coated steel rebar obtained from the slurry coating B is supported on two refractory blocks in an oven, and baked at 130° C. for 30 minutes.

Sintering: the baked steel rebar is taken out from the oven, placed in an electric furnace and heated up at a rate of 5° C./min to 500° C. and maintained at 500° C. for 10 minutes. Finally, the furnace is turned off and cooled to room temperature. The steel rebar with an anti-corrosion coating sintered at low temperature is obtained.

Embodiment 3

Pretreatment: same as embodiment 1.

Preparation of slurry coating: first, 42 weight percent nano-silica, 12 weight percent sodium metasilicate nonahydrate, 12 weight percent borax, 6 weight percent hydroxyethylcellulose, 15 weight percent calcium fluoride, 7 weight percent manganese dioxide, and 6 weight percent ferrosoferric oxide are weighed and poured into a material tank, and stirred for 30 seconds. The weight ratio of flux to nano-silica is 0.57. The material tank is placed into a mixing machine to mix for 3-5 minutes to yield the well-dispersed mixture A. After dry mixing, 22 weight percent water is added to the mixture A, wherein the weight ratio of the mixture A to water is 3:1, then the mixture is stirred until it turns slurry. Then the material tank is placed into the mixing machine to mix for 5-7 minutes to yield a well-dispersed slurry coating B. The slurry coating B is poured out and let stand for 10 minutes in the container. After monitoring that there is no stratification and no water on the top of the slurry; the slurry coating B is poured into a storage container for further use.

Coating: same as embodiment 1.

Baking: the coated steel rebar obtained from the slurry coating B is supported on two refractory blocks in an oven, and baked at 180° C. for 30 minutes.

Sintering: the baked steel rebar is taken out from the oven, placed in an electric furnace and heated up at a rate of 7.5° C./min to 430° C. and maintained at 430° C. for 10 minutes. Finally, the furnace is turned off and cooled to room temperature. The steel rebar with an anti-corrosion coating sintered at low temperature is obtained.

Embodiment 4

Pretreatment: same as embodiment 1.

Preparation of slurry coating: First, 48 weight percent nano-silica, 14 weight percent sodium metasilicate nonahydrate, 10 weight percent borax, 3 weight percent hydroxyethylcellulose, 10 weight percent calcium fluoride, 1 weight percent manganese dioxide, and 4 weight percent ferrosoferric oxide are weighed and poured into a material tank, and stirred for 30 seconds. The weight ratio of flux to nano-silica is 0.5. The material tank is placed into a mixing machine to mix for 3-5 minutes to yield a well-dispersed mixture A. After dry mixing, 23.6 weight percent water is added to the mixture A, wherein the weight ratio of the mixture A to water is 3:1, then the mixture is stirred until it turns slurry. Then the material tank is placed into the mixing machine to mix for 5-7 minutes to yield a well-dispersed slurry coating B. The slurry coating B is poured out and let stand for 10 minutes in a container. After monitoring that there is no stratification and no water on the top of the slurry; the slurry coating B is poured into a storage container for further use.

Coating: The same as embodiment 1.

Baking: The coated steel rebar obtained from the slurry coating B is supported on two refractory blocks in an oven, and baked at 160° C. for 30 minutes.

Sintering: The baked steel rebar is taken out from the oven, placed in an electric furnace and heated up at a rate of 7.5° C./min 470° C. and maintained at 470° C. for 10 minutes. Finally, the furnace is turned off and cooled to room temperature. The steel rebar with an anti-corrosion coating sintered at low temperature is obtained.

Embodiment 5

Pretreatment: The same as embodiment 1.

Preparation of slurry coating: First, 50 weight percent nano-silica, 34 weight percent borax, 5 weight percent hydroxyethylcellulose, 9 weight percent calcium fluoride, and 2 weight percent manganese dioxide are weighed and poured into a material tank, and then stirred for 30 seconds. The weight ratio of borax to nano-silica is 0.68. The material tank is placed into a mixing machine to mix for 3-5 minutes to yield a well-dispersed mixture A. After dry mixing, 20 weight percent water is added to the mixture A, wherein the weight ratio of the mixture A to water is 4.2:1, then the mixture is stirred until it turns slurry. Then the material tank is placed into the mixing machine to mix for 5-7 minutes to yield a well-dispersed slurry coating B. The slurry coating B is poured out and let stand for 10 minutes in a container. After monitoring that there is no stratification and no water on the top of the slurry; the slurry coating B is poured into a storage container for further use.

Coating: same as embodiment 1.

Baking: the coated steel rebar obtained from the slurry coating B is supported on two refractory blocks in an oven, and baked at 140° C. for 40 minutes.

Sintering: the baked steel rebar is taken out from the oven, placed in an electric furnace and heated up at a rate of 7.5° C./min to 520° C. and maintained at 520° C. for 10 minutes. Finally, the furnace is turned off and cooled to room temperature. The steel rebar with an anti-corrosion coating sintered at low temperature is obtained.

To verify the effect of corrosion resistance of the coating for steel rebars and coating method, tests are conducted and analyzed.

1) The results of five groups of corrosion tests are shown below. In each group, two coated steel rebars (one round steel rebar and one ribbed steel rebar) and two uncoated steel bars (one round steel rebar and one ribbed steel rebar) are placed into 5% sodium chloride solution simultaneously; an electric current is applied to accelerate the corrosion process, which nonetheless mimics natural corrosion process except for the accelerated pace.

From table 1 in FIG. 1, round steel rebars and ribbed steel rebars coated with the coatings sintered at low temperature are placed into 5% sodium chloride solution, and the corrosion resistance of coated steel rebars is 3-4 times better than that of the uncoated steel rebars. Therefore, the coated steel rebars of the invention can effectively delay and reduce corrosion in seawater.

2) Mechanical properties of the coated steel rebars.

The coated steel rebars of this invention are sintered at 400-550° C. It is well known that the high-temperature heat treatment will change the strength of steel rebars. Table 2 shows the change of strength and surface of the steel rebars after heat-treating at 200° C., 400° C., 600° C., and 800° C.

From table 2 in FIG. 2, the yield strength of steel rebars, which is heat-treated above 600° C., is decreased noticeably. When the temperature of heat treatment of steel rebars exceeds 800° C., the ultimate strength is decreased significantly, the cold bending performance is worse, and the surface morphology changes greatly. For the coated steel rebars of the present invention sintered below 600° C., the mechanical properties are not changed remarkably, which can ensure the original performance of steel rebars.

While the invention has been particularly shown and described as referenced to the embodiments thereof, those skilled in the art will understand that the foregoing and other changes in form and detail may be made therein without departing from the spirit and scope of the invention.

What is claimed is:

1. A coating method using an anti-corrosion coating sintered at low temperature; the anti-corrosion coating comprises 30-50 weight percent nano-silica, 20-40 weight percent flux, 9-20 weight percent calcium fluoride, 2-10 weight percent thickener, and 2-14 weight percent adhesion agent, wherein the flux contains sodium metasilicate nonahydrate or borax, or a combination thereof; the coating method comprising the steps of:

1) blending, without adding water, a mixture comprising the nano-silica, the flux, the calcium fluoride, the thickener and the adhesion agent that are weighted out according to a weight percent composition of the anti-corrosion coating, wherein the mixture is further placed in a container, stirred, and placed into a mixing machine to mix thoroughly to yield a mixture A;

2) adding water to the mixture A at a weight ratio of the mixture A to water (2-5):1 into the container, which is placed into a mixing machine to thoroughly mix to yield a slurry coating B;

3) pretreating steel rebars by removing rust of the steel rebars such that a surface of the steel rebars is washed and then dried;

4) coating the pretreated steel rebars obtained from step 3 such that the steel rebars are immersed in, rotated, and pulled out from the slurry coating B;

5) baking the coated steel rebars obtained from step 4 at 90-130° C. for 20-40 minutes;

6) sintering the baked steel rebars obtained from step 5 using a furnace such that the baked steel rebars obtained are hearted up at a rate of 3-10° C./minute to 400-550° C. and maintained at 400-550° C. for 10 minutes; and 7) cooling the sintered steel rebars at room temperature.

* * * * *